United States Patent
Kamimura

(10) Patent No.: US 6,826,130 B2
(45) Date of Patent: Nov. 30, 2004

(54) MAGNETO-OPTIC DISK DEVICE AND METHOD OF POSITIONING MAGNETIC HEAD OF THE DEVICE

(75) Inventor: Takaya Kamimura, Nara (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 135 days.

(21) Appl. No.: 10/297,916

(22) PCT Filed: Jun. 7, 2001

(86) PCT No.: PCT/JP01/04825
§ 371 (c)(1),
(2), (4) Date: Dec. 18, 2002

(87) PCT Pub. No.: WO01/99102
PCT Pub. Date: Dec. 27, 2001

(65) Prior Publication Data
US 2003/0133365 A1 Jul. 17, 2003

(30) Foreign Application Priority Data
Jun. 19, 2000 (JP) .................................. 2000-182599

(51) Int. Cl.[7] .............................................. G11B 11/00
(52) U.S. Cl. ..................................................... 369/13.2
(58) Field of Search ............................... 369/13.2, 215, 369/219

(56) References Cited

U.S. PATENT DOCUMENTS 5,557,589 A * 9/1996 Mukawa et al. ........... 369/13.2
RE35,608 E * 9/1997 Yamatani .................. 369/13.2

FOREIGN PATENT DOCUMENTS

| JP | 61-171911 | 8/1986 |
|---|---|---|
| JP | 06-162595 | 6/1994 |
| JP | 10-320707 | 12/1998 |
| JP | 11-250516 | 9/1999 |
| JP | 2000-123436 | 4/2000 |
| JP | 2000-149343 | 5/2000 |

* cited by examiner

Primary Examiner—George J. Letscher
(74) Attorney, Agent, or Firm—Westerman, Hattori, Daniels & Adrian, LLP

(57) ABSTRACT

The invention relates to a structure for and a method of adjusting the position of a magnetic head especially tangentially of a magnetic disk with improved accuracy for use in an optomagnetic disk device. The device has a head support unit 20 comprising a pickup 12 having an objective lens 10 mounted thereon, and a head arm 14 connected to the pickup 12 and provided with a magnetic head 16, the head arm 14 being adjustable in position relative to the pickup 12 so that the magnetic head 16 is opposed to the objective lens 10 on the pickup 12, the head support unit 20 being movable radially of the disk. The pickup 12 has at least one screw hole 22 for attaching the head arm 14 thereto, and the head arm 14 has a slit 24 opposed to the screw hole 22 of the pickup 12 and in parallel to the tangential direction of the disk. A screw 26 is slidably fitted in the slit 24 of the head arm 14 and has its distal end screwed in the screw hole 22. An elastic member 30 is provided between the screw 26 and the head arm 14 for pressing the head arm 14 against the pickup 12.

6 Claims, 7 Drawing Sheets

MAGNETO-OPTIC DISK DEVICE AND METHOD OF POSITIONING MAGNETIC HEAD OF THE DEVICE

TECHNICAL FIELD

The present invention relates to a structure for adjusting the position of the magnetic heads of optomagnetic disk devices for recording signals on or reproducing signals from optomagnetic disks, and to a method of adjusting the position.

BACKGROUND ART

As shown in FIG. 13, optomagnetic disk devices for minidisks comprise a head support unit 20 having a magnetic head 16 and an objective lens 10 which are opposed to each other as arranged on opposite sides of an optomagnetic disk 102 serving as a recording medium, with the lens 10 provided on a pickup 12. Signals are recorded on or reproduced from the disk 102 while moving the head support unit 20 radially of the disk 102.

The pickup 12 has a laser light source incorporated therein for projecting a laser beam as converged by an objective lens on the optomagnetic disk 102. With the recording layer on the disk heated to a Curie temperature with the projected laser beam, alternating current is passed through the core of the magnetic head 16 to set up a magnetic field on the head 16, whereby the recording layer is magnetized for signal recording. Signals are reproduced from the recording layer when the pickup 12 receives the laser beam projected on the layer and reflected therefrom.

To effectively apply the magnetic field of the magnetic head to the optomagnetic disk, there is a need to align the center of the head with that of the objective lens by position adjustment.

Accordingly, the position of the magnetic head is adjusted relative to the pickup by moving the head radially and tangentially of the disk.

A head support unit 20 adapted to adjust the position of the magnetic head 16 will be described with reference to FIGS. 13 and 14, and FIG. 1 of the invention.

The pickup 12 is in engagement with a drive screw rod 54 mounted on an optomagnetic disk device 44 (see FIG. 1), and is reciprocatingly movable radially of the disk (in the directions of arrows in FIG. 1) by the screw thrust of the drive screw rod 54. Formed in one end of the pickup 12 are screw holes 22 for use in attaching a head arm 14.

The head arm 14 comprises a support piece 62 attached to a bottom wall of the pickup 12 and adjustable in position, and a head lever 64 carrying the magnetic head 16 at its forward end, mounted on the support piece 62 and adjustable in position.

The support piece 62 has slits 24 parallel to a tangential direction of the disk and positioned in corresponding relation with the screw holes 22 in the pickup 12. The pickup 12 and the support pieces 62 are held in engagement by screws 100 slidably fitting in the slits 24 and screwed in the screw holes 22, respectively. With the screws 100 loosened, the support piece 62 is slidable tangentially of the disk relative to the pickup 12. When the screws 100 are tightened up after the magnetic head 16 has been positioned in place tangentially of the disk, the heads of the screws press the support piece 62 against the pickup 12 to fix the support piece 62 to the pickup 12. A screw locking agent is applied to the screw heads for preventing the screws 100 from loosening after the screws 100 have been tightened up.

The support piece 62 is bent upward at one end thereof, and the bent portion is provided at its upper end with a bracket 68. The head lever 64 is supported by an adjusting screw 76 on the bracket 68 slidably radially of the disk and adjustably in position. The screw 76 is in screw-thread engagement with the bracket 68. A compression spring (not shown) fitted around the adjusting screw 76 for biasing the head lever 64 radially of the disk is provided between two brackets of the support piece 62 and the head lever 64. The head lever 64 is moved radially of the disk by turning the adjusting screw 76, whereby the position of the magnetic head 16 is adjusted radially of the disk. The screw locking agent is applied to the portion of the screw 76 screwed in the bracket 68 to prevent the screw 76 from rotating.

For use with conventional minidisks, the magnetic head has a relatively large core size of about 700 $\mu$m×700 $\mu$m, so that the position of the magnetic head is adjustable satisfactorily under a microscope if accuracy is attained to some extent. Further even if the head is somewhat shifted when the fixing screws 100 are tightened up after the position adjustment of the head, the shift is considered permissible.

Low power consumption and a high magnetic field efficiency are required of the magnetic disk device, Advanced Strage MO (trademark: AS-MO), having a superhigh resolution and proposed in recent years. Accordingly, the core size of the magnetic head of this device is as small as up to about 400 $\mu$m radially of the disk and about 150 $\mu$m tangentially thereof, such that satisfactory performance is no longer available if the head is positioned in place under a microscope. Especially, some magnetic heads have a core size of about 100 $\mu$m tangentially of the disk, and the adjustment of the position of such a head in the disk tangential direction is of extreme importance.

However, the head support unit is so constructed that the support piece of the head arm is fastened to the pickup with the screws 100 after the position of the magnetic head has been adjusted tangentially of the disk as described above, so that the support piece 62 is likely to bend when fastened to the pickup as seen in FIG. 15 (as indicated at P in the drawing). A residual stress is then likely to remain in the support piece 62, possibly shifting the magnetic head during or after fastening. Further since the pickup 12 and head arm 14 are generally made from a metal plate by blanking, these components are each likely have a strain, with the result that the magnetic head as accurately adjusted in position will be shifted when subsequently fastened.

An object of the present invention is to provide an optomagnetic disk device having a magnetic head which can be positioned accurately especially tangentially of the magnetic disk, and a method of adjusting the position of the magnetic head.

DISCLOSURE OF THE INVENTION

The present invention provides an optomagnetic disk device 44 wherein a head support unit 20 comprises a pickup 12 having an objective lens 10 mounted thereon for converging a laser beam, and a head arm 14 connected to the pickup 12, the head arm 14 having one end attached to the pickup 12 and a free end provided with a magnetic head 16, the head arm 14 being adjustable in position relative to the pickup 12 so that the magnetic head 16 is opposed to the objective lens 10 on the pickup 12, the head support unit 20 being movable radially of an optomagnetic disk, the pickup 12 having at least one screw hole 22 for attaching the head arm 14 thereto, the head arm 14 having a slit 24 opposed to the screw hole 22 of the pickup 12 and in parallel to a tangential direction of the disk, a screw 26 being slidably fitted in the slit 24 of the head arm 14 and having a distal end screwed in the screw hole 22 of the pickup 12, an elastic member 30 being provided between the screw 26 and the head arm 14 for pressing the head arm 14 against the pickup 12.

For use in the optomagnetic disk device 44, the present invention provides a method of adjusting the position of the magnetic head 16 which method comprises moving the head arm 14 relative to the pickup 12 tangentially of the disk, with the head arm 14 pressed against the pickup 12 by the elastic member 30, to adjust the position of the magnetic head 16 relative to the objective lens 10 on the pickup 12 and thereafter fixing the head arm 14 to the pickup 12.

The head arm 14 as adjusted in position can be fixed to the pickup 12 by applying a screw locking agent.

Since the head arm 14 is attached to the pickup 12, as pressed against the pickup 12 by the elastic member 30, the head arm 14 can be moved tangentially of the disk by applying a force to the arm in this direction. In this state, the head arm 14 is slidingly moved tangentially of the disk to adjust the position of the magnetic head 16.

Although the position adjustment can be made, for example, under a microscope, it is desirable to make the adjustment while passing a current through the magnetic head 16 and reading the resulting output signal, if an improved accuracy is to be achieved in the case where the head 16 has a small core size as will be described later.

When the position of the magnetic head 16 has been completely adjusted, the head arm 14 is fixed to the pickup 12. The arm can be fixed by applying the screw locking agent. When thus fixed with use of the locking agent, the arm is free of shifting or residual stress that would occur when screws are tightened up for locking, and can therefore be fixed without displacing the magnetic head to accurately adjust the position of the head.

BEST MODE OF CARRYING OUT THE INVENTION

An optomagnetic disk device 44 of the present invention will be described below with reference to the drawings. The parts similar to those of the prior art will each be referred to by the same corresponding numeral.

Figure 1:
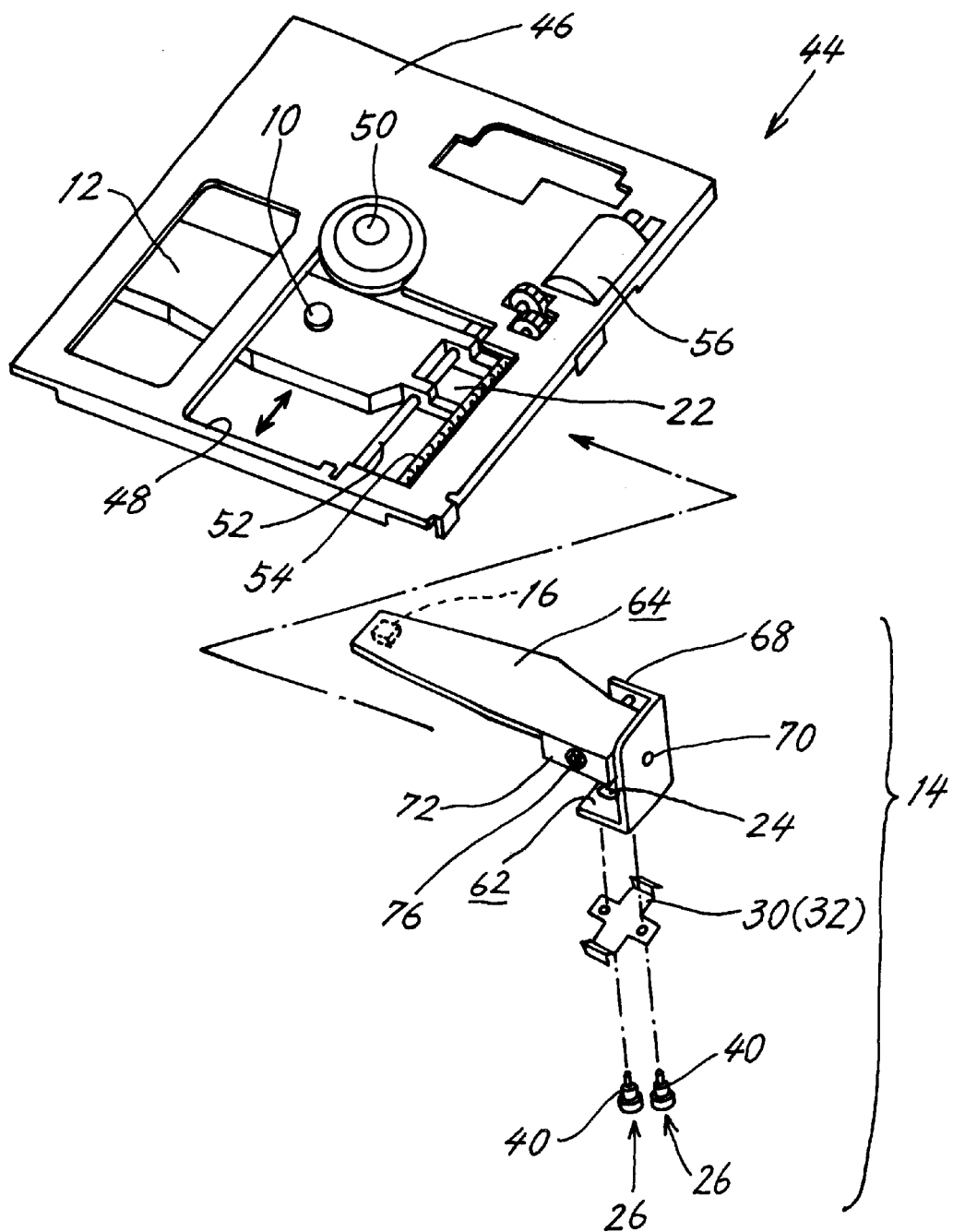
FIG. 1 is an exploded perspective view of an optomagnetic disk device of the invention.

With reference to FIG. 1, the device 44 has a chassis 46 provided with an opening 48. The opening 48 is provided with a turntable 50 for rotating an optomagnetic disk and a pickup 12. The pickup 12 has incorporated therein a laser light source (not shown) for projecting a laser beam on the signal recording layer of the disk by an objective lens 10. The objective lens 10 is movable upward or downward for focusing and also tangentially of the disk for scanning the recording layer.

The pickup 12 is slidably in engagement with a guide rod 52 extending across the opening 48 and a guide bar (not shown) positioned at the forward end of the pickup 12 in parallel to the guide rod 52.

The chassis 46 is provided with a drive screw rod 54 parallel to the guide rod 52 and coupled to a motor 56. A projection (not shown) extending from the pickup 12 is in screw-thread engagement with the screw rod 54, such that the pickup 12 is reciprocatingly movable radially of the disk by the thrust of the screw when the drive screw rod 54 is rotated by the motor 56.

Figure 5:
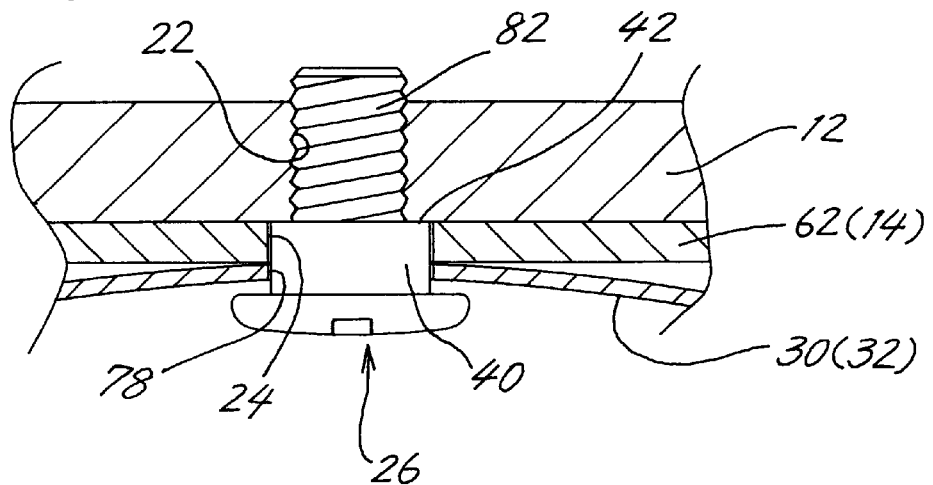
FIG. 5 is an enlarged view in section of the portion encircled as at B in FIG. 3.
Figure 6:
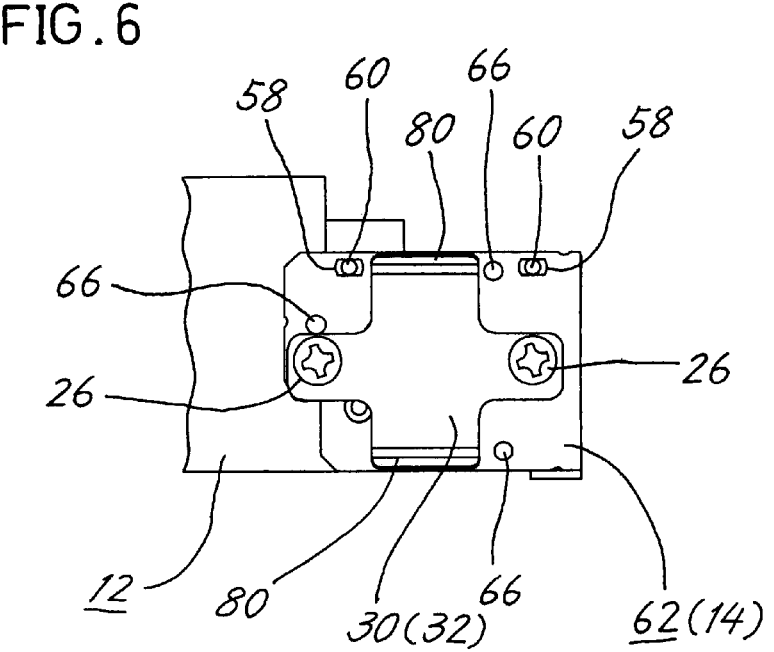
FIG. 6 is a bottom view of the same as it is seen from the direction of arrow C in FIG. 3.

The bottom wall of base end of the pickup 12 is provided with screw holes 22 for use in attaching a head arm 14 as seen in FIG. 5 and with dowels 60, 60 fittable in slits 58, 58 in the head arm 14 as shown in FIG. 6.

With reference to FIGS. 2 to 6, the head arm 14 comprises a support piece 62 to be attached to the pickup 12 and adjustable in position, and a head lever 64 mounted on the support piece 62 adjustably in position and carrying a magnetic head 16 at its distal end.

Figure 2:
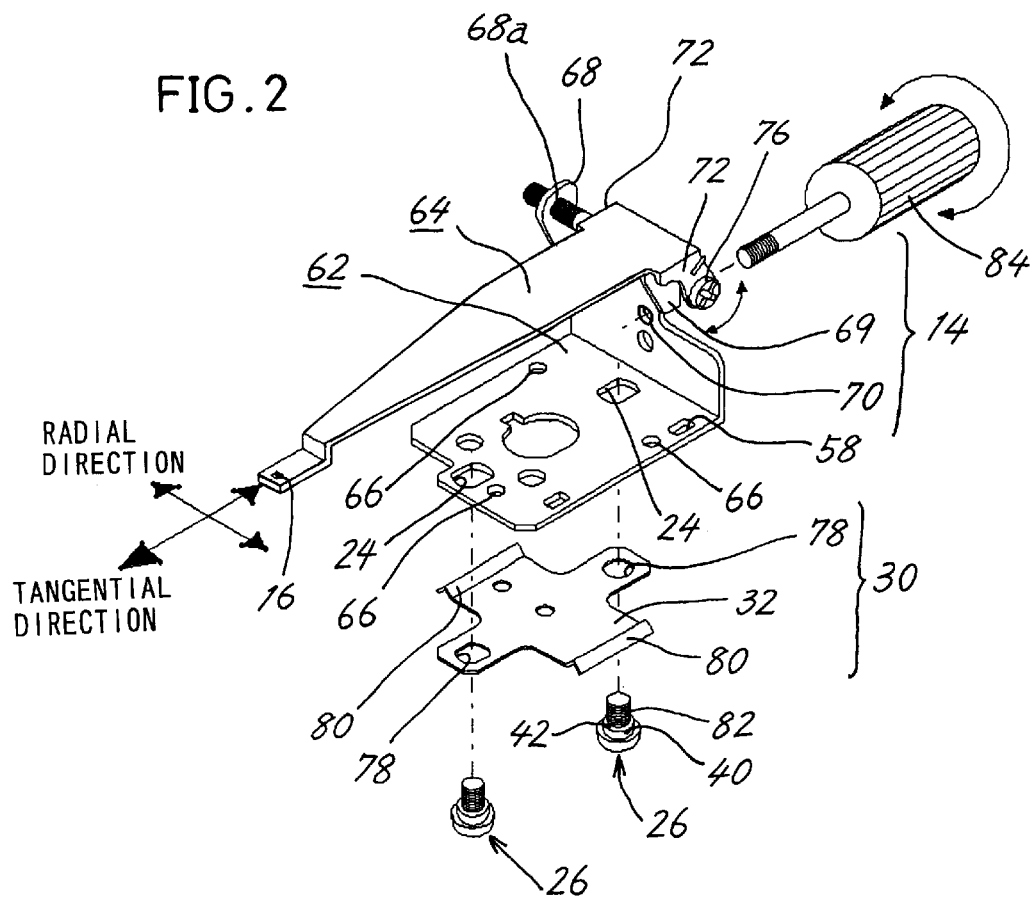
FIG. 2 is an exploded perspective view of a head arm and an elastic member.

The support piece 62 has slits 24, 24 parallel to the tangential direction of the disk and positionable as opposed to the screw holes 22, 22 of the pickup 12. The slits 58, 58 in the support piece 62 are parallel to the slits 24, 24 and positioned in corresponding relation with the dowels 60, 60 of the pickup 12 (FIGS. 2 and 6). The support piece 62 is further provided with locking holes 66, 66, 66 for use in applying a screw locking agent when the support piece 62 is fixed to the pickup 12.

The support piece 62 has a base end bent upward, and the upper end of the bent portion has a pair of brackets 68, 69. A screw hole 68a is formed in one of the brackets, 68, while a hole (not shown) having a larger diameter than the screw hole 68a is formed in the other bracket 69.

An adjusting screw hole 70 is formed in the bent portion of the support piece 62 for adjusting the position of the head arm 14 tangentially of the disk by moving the head arm 14 tangentially of the disk.

[Structure for Adjusting Position in Radial Direction]

The head lever 64 is provided with brackets 72, 72 at its base end. As shown in FIG. 2, the support piece 62 and the head lever 64 are so arranged that the bracket 69 of the support piece 62 is positioned between the brackets 72, 72 of the head lever 64, with a compression spring (not shown)

interposed between the brackets 69, 72. An adjusting screw 76 is inserted through the brackets 69, 72, 72 and the compression spring. The adjusting screw 76 has a threaded end screwed in the screw hole 68a of the bracket 68 of the support piece 62.

When the adjusting screw 76 is rotated, the head lever 64 moves relative to the support piece 62 radially of the disk, whereby the position of the magnetic head 16 can be adjusted radially of the disk. The adjustment of the position will be described later in detail.

The head arm 14 is attached to the pickup 12 as pressed into contact with the pickup 12 by an elastic member 30.

The elastic member 30 is means for holding the support piece 62 in pressing contact with the pickup 12. This means will be described below with reference to a plate spring 32 shown in FIG. 2. Different embodiments of elastic member 30 will be described later.

The plate spring 32 of FIG. 2 has attaching holes 78, 78 which are positionable as opposed to the respective slits 24 of the support piece 62. The plate spring 32 extends radially of the disk and is provided at opposite side edges thereof with respective ridges 80, 80 projecting toward the support piece.

To attach the head arm 14 to the pickup 12 along with the elastic member 30, stepped screws 26 are usable as shown in FIG. 5. The stepped screws 26 each have a stepped portion 40 of large diameter at its head and a threaded end portion 82.

The pickup 12, the head arm 14 and the plate spring 32 are fitted together so that the screw holes 22 of the pickup 12, the slits 24 of the head arm support piece 62 and the attaching holes 78 of the plate spring 32 are in register, with the dowels 60 of the pickup 12 fitted in the slits 58 of the support piece 62, the stepped screws 26 are inserted through the assembly from the plate spring side 32, and the screw portions 82 of the screws 26 are screwed into the screw holes 22 of the pickup 12 as shown in FIG. 5.

Figure 4:
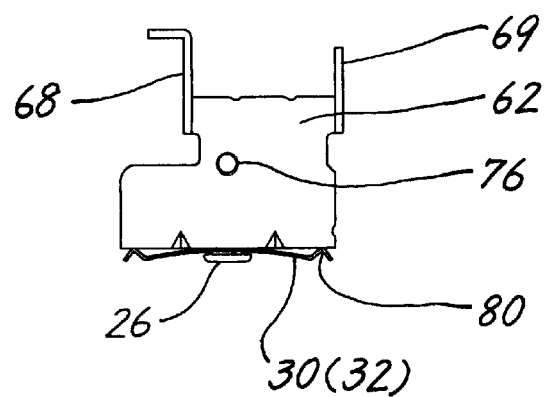
FIG. 4 is a rear view of the same as it is seen from the direction of arrow A in FIG. 3.

The stepped screws 26 are fastened to the pickup 12 with the bottom faces 42 of stepped portions 40 of the stepped screws 26 brought into contact with the pickup 12 and with the support piece 62 and the plate spring 32 fitted around the stepped portions 40. The center portion of the plate spring 32 which portion has the attaching holes 78, 78 is bent toward the support piece 62, with the side ridges 80, 80 in bearing contact with the support piece 62 as shown in FIGS. 4 and 5, for the plate spring 32 to hold the support piece 62 in pressing contact with the pickup 12.

[Structure for Adjusting Position in Tangential Direction]

With the stepped screws 26 tightened up as screwed in the screw holes 22 of the pickup 12, the support piece 62 of the head arm 14 is merely pressed in contact with the pickup 12, so that if pushed or pulled tangentially of the disk, the head arm 14 is slidingly moved within the range of the slits 24.

Figure 3:
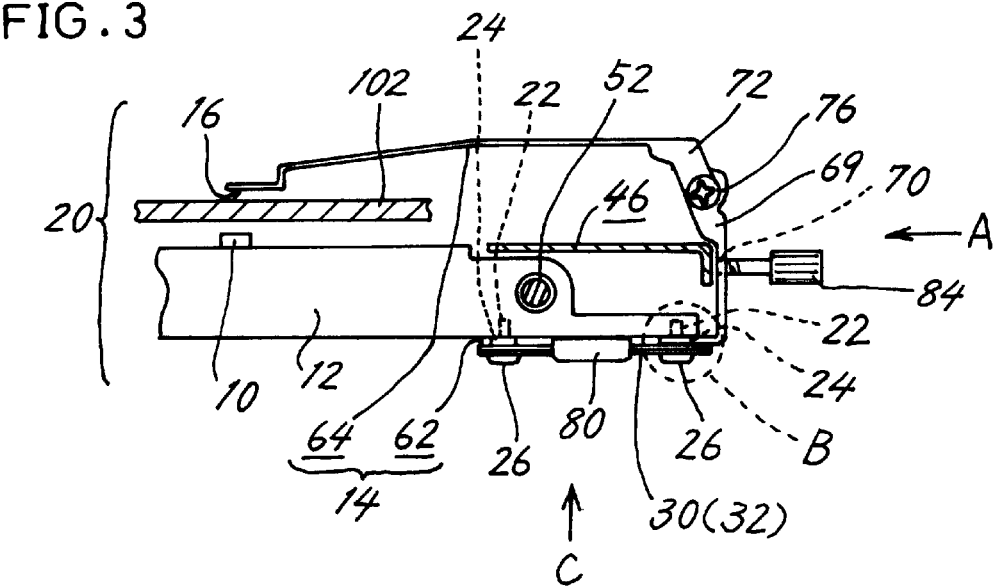
FIG. 3 is an enlarged side elevation of the base end portion of a head support unit.

In this state, the position of the magnetic head 16 is adjusted in the tangential direction. The position is adjusted tangentially of the disk by screwing the adjusting screw 84 (see FIG. 2) into the adjusting screw hole 70 formed in the bent portion of the support piece 62. The adjusting screw 84 is turned in screw-thread engagement with the hole portion 70 until the forward screw end comes into contact with the chassis 46. When the screw 84 is turned in the tightening direction with the end of the screw 84 in pushing contact with the chassis 46 as seen in FIG. 3, the head arm 14 moves away from the chassis 46 under the action of the thrust of the screw. Alternatively if the adjusting screw 84 is turned in the reverse direction with the screw end in pushing contact with the chassis 46, the head arm 14 moves toward the chassis 46.

The position of the magnetic head 16 is adjustable relative to the pickup 12 tangentially of the disk by turning the adjusting screw 84 as described above. The adjustment of position will be descried later in greater detail.

When the head 16 has been adjusted in position, the support piece of the head arm 14 can be fixed to the pickup 12 by withdrawing the adjusting screw 84 from the screw hole 70 and applying the screw locking agent to the locking holes 66.

[Method of Adjusting Position of Magnetic Head]

The method of adjusting the position of the magnetic head 16 of the optomagnetic disk device 44 of the above construction will be described.

Figure 7:
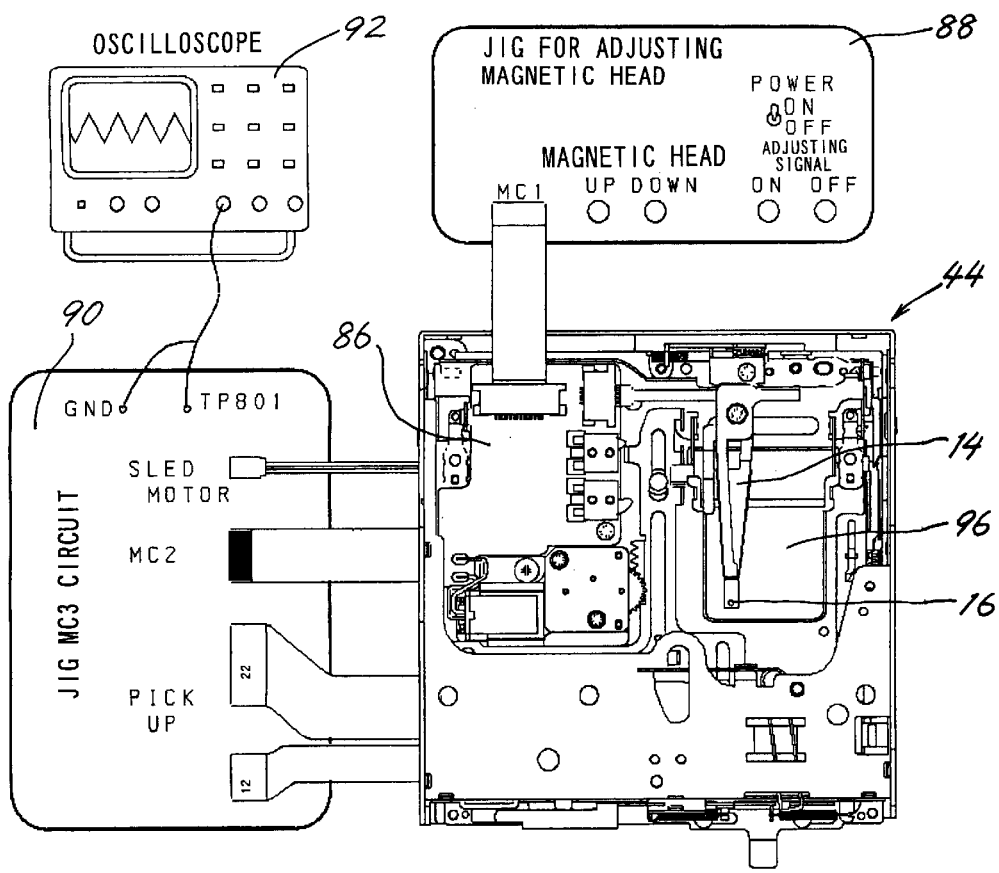
FIG. 7 is a diagram for illustrating a system for adjusting the position of a magnetic head.
Figure 8:
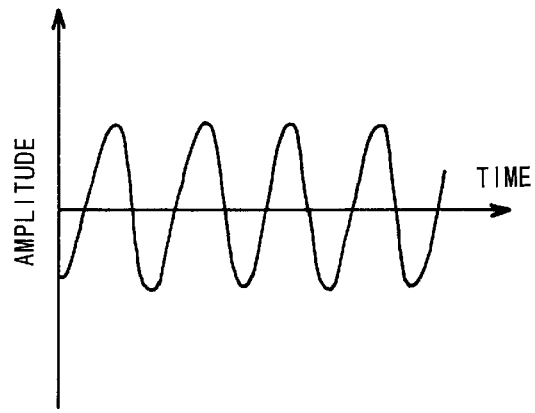
FIG. 8 is a graph showing the waveform of an output signal on an oscilloscope.

FIG. 7 is a plan view of the optomagnetic disk device 44 with a cover removed. The magnetic head 16, motor 56, drive mechanism for the objective lens 10 of the pickup 12, laser light source, turntable 50, etc. are electrically connected to a board 86 in the known manner and made controllable or drivable. Connected to the board 86 are a jig 88 for adjusting the magnetic head and a jig 90 for controlling the pickup 12. The pickup control jig 90 has connected thereto signal detecting means such as an oscilloscope 92 for displaying the waveform of the signal output from the pickup 12.

[Adjusting Position Tangentially of Disk]

First, an optomagnetic disk 96 having high planarity for adjusting the magnetic head is placed on the turntable 50, the circuit is electrically adjusted initially, a monitor is operated for an output, the pickup is moved, the laser is turned on to give a playback output to cause a beam to make a still jump on the land of the disk 96.

Next, the magnetic head 16 is lowered, and an alternating current is passed through the head 16. In this state, the adjusting screw 84 is turned to move the head arm 14 tangentially of the disk. As the magnetic head 16 moves toward the center of the objective lens 10 of the pickup 12, the amplitude of the output signal of the oscilloscope 92 increases, so that the position where the amplitude is maximum is found with reference to the amplitude on the oscilloscope 92. When the position where the amplitude is maximum is found, this indicates that the magnetic head 16 and the objective lens 10 of the pickup 12 match in position with respect to the tangential direction of the disk. Accordingly, the adjusting screw 84 is removed in this state so that no force will act on the head lever 64. The screw locking agent is then applied to the locking holes 66, 66, 66 of the support piece 62 for fixing, whereby the magnetic head 16 is completely adjusted in position tangentially of the disk.

[Adjusting Position Radially of the Disk]

After the head has been adjusted in position tangentially of the disk, the position of the head is adjusted radially of the disk.

The objective lens 10 as focused is reciprocatingly moved tangentially of the disk a plurality of times. The head lever 64 is moved radially of the disk by rotating the adjusting screw 76 so that the oscilloscope 64 will display the best output waveform when the lens is thus moved tangentially of the disk. When the position where the best output waveform is available is found, this indicates that the magnetic head 16 and the objective lens 10 of the pickup 12 match in position radially of the disk. Accordingly, the screw locking agent is applied to the threaded portion of the adjusting screw 76 to lock the screw 76 and complete the position adjustment of the head 6 with respect to the disk radial direction.

When the position of the magnetic head has been completely adjusted both tangentially and radially of the disk, the magnetic head 16 is deenergized and then raised, the adjusting disk 96 is removed for the completion of adjustment.

[Other Embodiments of Elastic Member]

Figure 9:
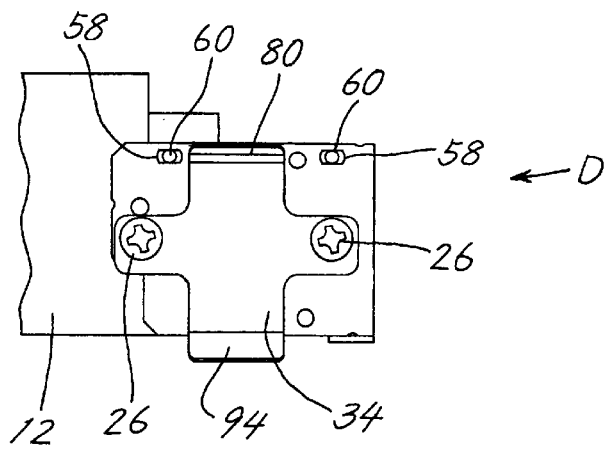
FIG. 9 is an enlarged bottom view of the base end portion of the head support unit to show another embodiment of elastic member.
Figure 10:
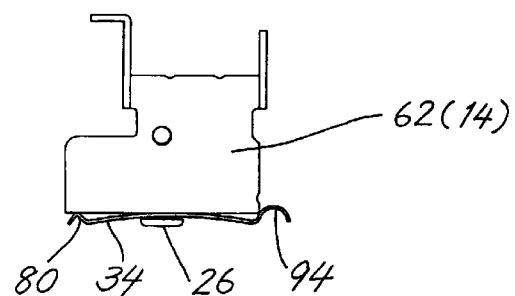
FIG. 10 is a rear view of the same as it is seen from the direction of arrow D in FIG. 9.

Besides the plate spring 32 described, the elastic member 30 can be a plate spring 34 shown in FIGS. 9 and 10. This plate spring 34 has one side projecting outward beyond the support piece 62, and the projecting portion is bent upward as at 94. The plate spring 34 has a ridge 80 for pressing the support piece 62 against the pickup 12. The bent portion 94 presses the support piece 62 against the side face of the dowel 60. The support piece 62 is attached with improved accuracy by being biased in two directions in this way.

Figure 11:
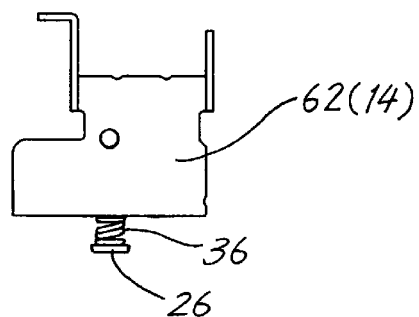
FIG. 11 is a rear view of the base end portion of the head support unit to show another embodiment of elastic member.
Figure 12:
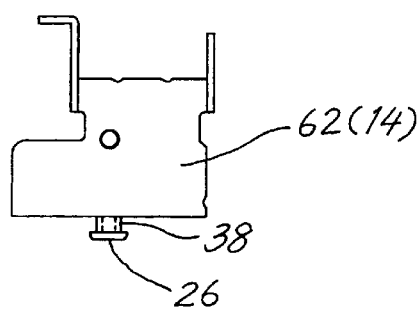
FIG. 12 is a rear view of the base end portion of the head support unit to show still another embodiment of elastic member.
Figure 13:
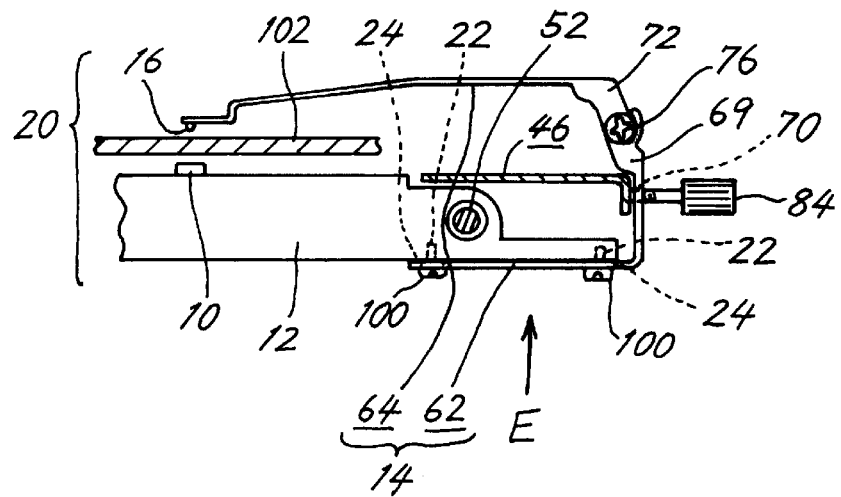
FIG. 13 is an enlarged side elevation of the base end portion of a conventional head support unit.
Figure 14:
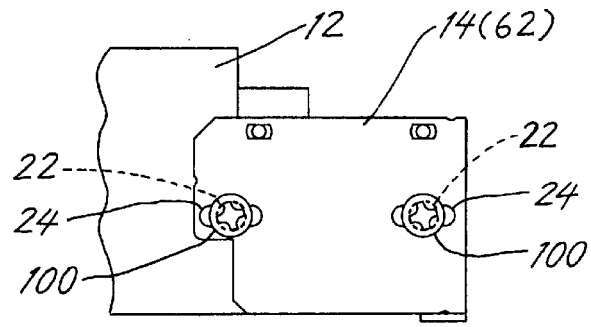
FIG. 14 is a bottom view of the same as it is seen from the direction of arrow E in FIG. 13.
Figure 15:
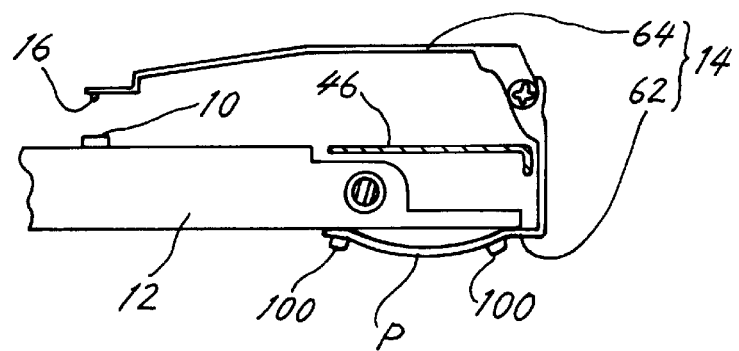
FIG. 15 is an enlarged side elevation of the conventional head support unit to show a support piece thereof as attached in a bent state.

The elastic member 30 can be a coil spring 36, rubber member 38 or like member fitted around the screw 26 as seen in FIG. 11 or 12. The support piece 62 can be pressed into contact with the pickup 12 by any of these means.

The above embodiments have been described to illustrate the present invention and should not be construed as limiting the invention set forth in the appended claims or reducing the scope thereof. The device of the invention is not limited to these embodiments in construction but can be modified variously within the technical scope defined in the claims.

Industrial Applicability

With the optomagnetic disk device of the invention and the method of adjusting the position of the magnetic head of the device according to the invention, the position can be adjusted accurately to align the center of the head with the center of the objective lens, ensuring effective application of the magnetic field of the head to optomagnetic disks.

What is claimed is:

1. An optomagnetic disk device wherein a head support unit comprises a pickup having an objective lens mounted thereon for converging a laser beam, and a head arm connected to the pickup, the head arm having one end attached to the pickup and a free end provided with a magnetic head, the head arm being adjustable in position relative to the pickup so that the magnetic head is opposed to the objective lens on the pickup, the head support unit being movable radially of an optomagnetic disk, the optomagnetic disk device being characterized by comprising:

the pickup having at least one screw hole for attaching the head arm thereto;

the head arm having a slit opposed to the screw hole of the pickup and in parallel to a tangential direction of the disk;

a screw slidably fitted in the slit of the head arm and having a distal end screwed in the screw hole of the pickup; and an elastic member provided between the head of the screw and the head arm for pressing the head arm against the pickup, to the extent that the head arm slidingly moves tangentially of the disk to adjust the position of the magnetic head.

2. The optomagnetic disk device according to claim 1 wherein the elastic member is a plate spring, coil spring or rubber member.

3. The optomagnetic disk device according to claim 1 wherein the screw is a stepped screw having a stepped portion fitting in the elastic member and the slit of the head arm, and the stepped portion has a bottom face in contact with the pickup.

4. The optomagnetic disk device according to claim 2 wherein the screw is a stepped screw having a stepped portion fitting in the elastic member and the slit of the head arm, and the stepped portion has a bottom face in contact with the pickup.

5. A method of adjusting the position of the magnetic head of the optomagnetic disk device as defined in claim 1 the method comprising:

moving the head arm relative to the pickup tangentially of the disk, with the head arm pressed against the pickup by the elastic member, to adjust the position of the magnetic head relative to the objective lens on the pickup; and fixing the head arm to the pickup.

6. The method of adjusting the position of the magnetic head of the optomagnetic disk device according to claim 5 wherein the head arm is fixed to the pickup by applying a screw locking agent.

* * * * *